Patented Nov. 11, 1952

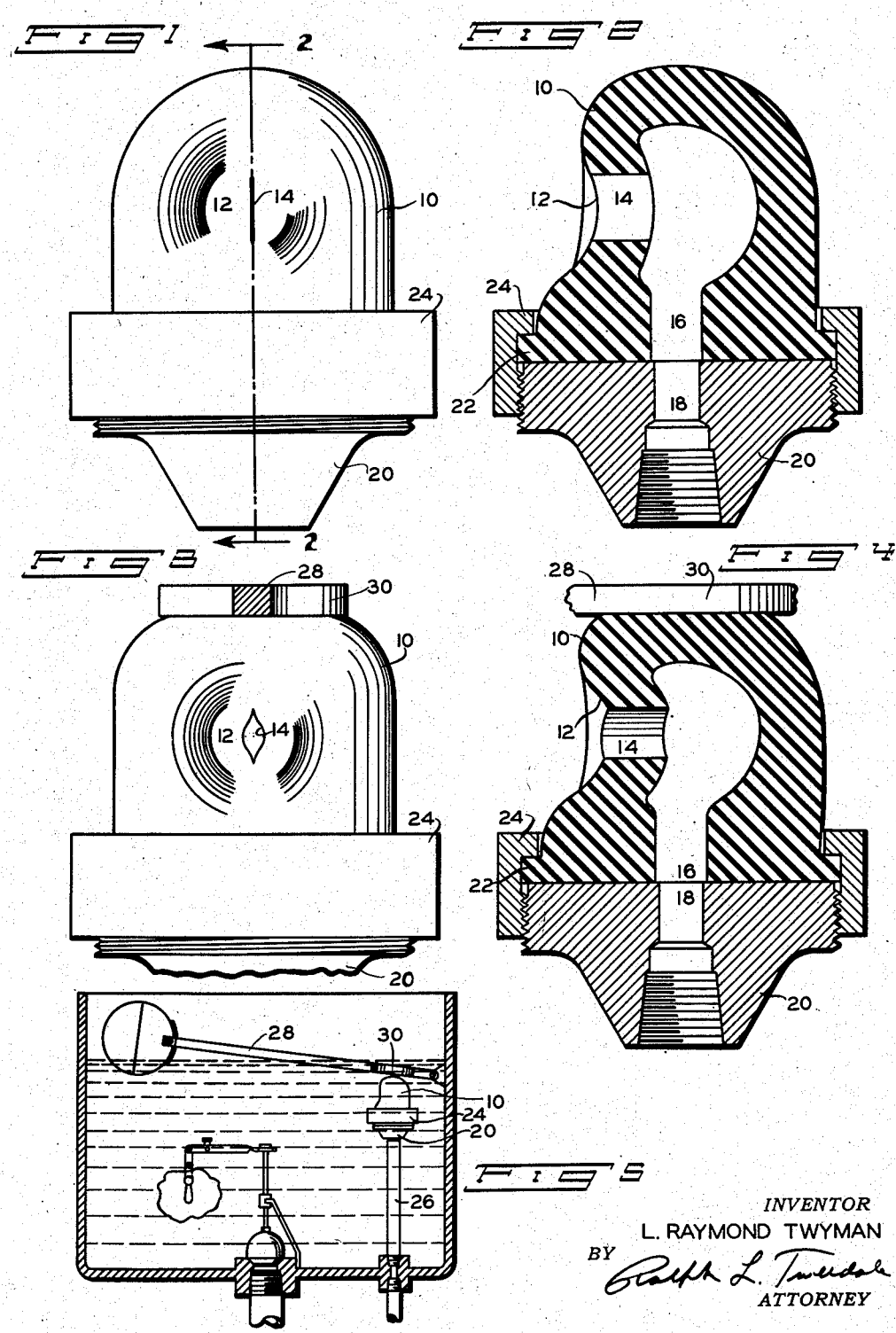

2,617,625

UNITED STATES PATENT OFFICE 2,617,625

VALVE

L. Raymond Twyman, Bloomfield Township, Oakland County, Mich.

Application May 11, 1946, Serial No. 669,159

6 Claims. (Cl. 251—122)

This invention relates to valves. The invention is more particularly concerned with valves utilizing a flexible wall for the purpose of opening and closing a passage.

It is an object of the present invention to provide a valve of flexible material such as rubber or the like in which the opening of the fluid passage through the valve is obtained entirely by flexing action and in which no relatively movable sliding or abutting rigid parts are used at the actual surfaces where fluid flow is controlled by the valve. Substantially all valves as heretofore constructed, with the exception of tube compressors, have utilized two or more relatively movable rigid parts and have necessitated the provision of some means for permitting such relative movement without permitting the passage of fluid at the point where the inner member projects through the outer member. The packings, flexible diaphragms, etc., which have been used for this purpose are in many cases short-lived and, if not short-lived, are relatively expensive.

The present invention provides a valve in which the controlling passage is opened and closed without necessitating any relatively movable rigid parts which are in contact with the fluid being controlled thus eliminating the necessity for packing and the like.

Another object of the present invention is to provide a valve of this character which is exceedingly inexpensive, simple to construct, install and replace, and easily operated and which has a relatively long, useful life.

It is also an object of the present invention to provide a valve of this character which when closed is automatically self-sealing under the action of applied fluid pressure.

Another object is to provide a valve of this general character in which the valve may be opened and closed with a snap action effect.

It is also an object to provide a valve in which interference with the operation of the valve by reason of accumulated deposits, corrosion and erosion may be materially decreased.

Further objects and advantages of the present invention will be apparent from the following description, reference being had to the accompanying drawing wherein a preferred form of the present invention is clearly shown.

In the drawing:

Figure 1 is a front view of a valve embodying a preferred form of the present invention.

Figure 2 is a longitudinal cross section on line 2—2 of Figure 1.

Figure 3 is a view corresponding to Figure 1 showing the valve in the open position.

Figure 4 is a view corresponding to Figure 2 showing the valve in the open position.

Figure 5 is a longitudinal sectional view of a toilet tank incorporating a valve as illustrated in Figures 1 through 4.

Referring first to Figure 1, the valve comprises a one-piece hollow member 10 formed of rubber or other material having flexible and elastic characteristics. The member 10 is shaped somewhat as a hemisphere with a cylindrical extension at its lower end. As seen in cross section in Figure 2, however, it is provided with an exteriorly-concave wall portion 12, the inner surface of which is convex and may be of uniform thickness as shown, or may be of tapering thickness. The wall 12 is pierced by a longitudinal slit 14, the side walls of which normally contact one another.

The lower portion of the member 10 is provided with an inlet passage 16 which registers with an inlet passage 18 formed in a base block 20. The member 10 may be secured to the base block 20 by any suitable means, and, in the form illustrated, the lower portion of the member 10 is provided with a flange 22 engaged by a nut 24 which is screwed on to the base block 20.

Referring now to Figure 5, the valve is shown as adapted for use in an ordinary toilet tank, in which case, the base block 20 is screwed to the upstanding inlet pipe 26. The usual float-arm 28 is provided with a flat enlargement 30 overlying the top of the member 10 and is so pivoted that downward movement of the float will cause the flat portion 30 to bear on the top of the member 10.

In operation, with the valve in the closed position as shown in Figures 1 and 2, it will be seen that, due to the arched nature of the curved wall portion 12, fluid pressure existing in the interior of member 10 will tend to bend the wall portion 12 to the left as in Figure 2. Because of the arch action, this tends to wedge the two side walls of the slit 14 more firmly into engagement and hence to tightly seal the slit.

As shown in Figures 3 and 4, however, when an external force is applied to the top of the member 10 in opposition to fluid pressure, the curved wall portion 12 may be bent to a greater curvature and the slit shortened in the endwise direction. This results in opening the slit in a shape somewhat as shown in Figure 3, thus permitting fluid to pass therethrough. Upon release of the endwise external force on member 10, the curved wall 12 seeks its original position, and thereafter the slit is more tightly closed by the action of fluid pressure as previously described.

It will be noted that as the top of the member 10 is gradually compressed by the member 30, the first flexure of the curved wall portion 12 will alter the stresses therein without at first opening the slit 14. When these stresses have increased to the point where they just overbalance the pressure stresses created by the fluid pressure inside the member 10, the slit 14 will open and by admitting pressure fluid therethrough will suddenly unbalance the stresses which have been tending to hold the slit closed so that the slit will open suddenly. As the member 10 is unflexed, a reverse action takes place causing the slit to snap shut during the final movement of the flexing member 30. This provides a snap action which avoids throttling or wire drawing erosion.

It will also be noted that due to the repeated flexing of the entire body member 10 in operation, any scale or similar deposits which tend to form on the valve will be flaked off as rapidly as they form and that the member being constructed of rubber is not liable to corrosive deterioration.

While the form of embodiment of the invention as herein disclosed constitutes a preferred form, it is to be understood that other forms might be adopted, all coming within the scope of the claims which follow.

What is claimed is as follows:

1. A valve for controlling fluid flow comprising a unitary member formed of a material having flexible and resilient characteristics, said member having an interiorly convex wall portion provided with a slit therein and adjacent wall portions which wall portions define an open ended chamber, a mounting member attached to the open end of said unitary member, said convex wall portion being so positioned relative to said mounting member and certain of said adjacent wall portions that it flexes in response to external pressures applied to said unitary member at the closed end thereof, said flexing of said convex wall portion serving to open said slit, the resilience of said member and internally applied fluid pressures tending to close said slit and hold it closed.

2. The structure of claim 1 wherein said mounting member has a passage therethrough defining an inlet for the valve.

3. The structure of claim 1 wherein said certain of said adjacent wall portions and said mounting member lie on opposite sides of said concave wall portions.

4. The structure of claim 1 wherein said slit extends substantially parallel to the direction in which said externally applied force acts.

5. The structure of claim 1 wherein said certain of said adjacent wall portions and said mounting member lie on opposite sides of said concave wall portions and said slit extends substantially parallel to a line joining said certain of said adjacent wall portions and said mounting member.

6. A hollow valve member formed of a material having flexible and resilient characteristics, said member having an interiorly convex side wall portion provided with a slit therein and adjacent wall portions, which wall portions define a chamber closed at one end and open at the other, the open end of said member being substantially at right angles to said side wall portion and adapted for attachment to a mounting member, deforming of said convex wall resulting from movement of said closed end wall toward said open end serving to open said slit, the resilience of said member and internally applied fluid pressures acting to close said slit and hold it closed.

L. RAYMOND TWYMAN.

REFERENCES CITED

The following references are of record in the file of this patent:

UNITED STATES PATENTS

| Number | Name | Date |
| --- | --- | --- |
| 274,447 | Kennish | Mar. 20, 1883 |
| 507,224 | Johnson | Oct. 24, 1893 |
| 670,725 | Pickett | Mar. 26, 1901 |
| 1,238,521 | Janish | Aug. 28, 1917 |
| 2,069,105 | Engle | Jan. 26, 1937 |
| 2,075,249 | Wilson | Mar. 30, 1937 |
| 2,218,308 | Comer | Oct. 15, 1940 |

FOREIGN PATENTS

| Number | Country | Date |
| --- | --- | --- |
| 23,843 | Great Britain | of 1892 |
| 502,094 | Great Britain | of 1937 |